No. 885,309. PATENTED APR. 21, 1908.
G. S. ADAMS.
RAKE.
APPLICATION FILED JAN. 22, 1908.
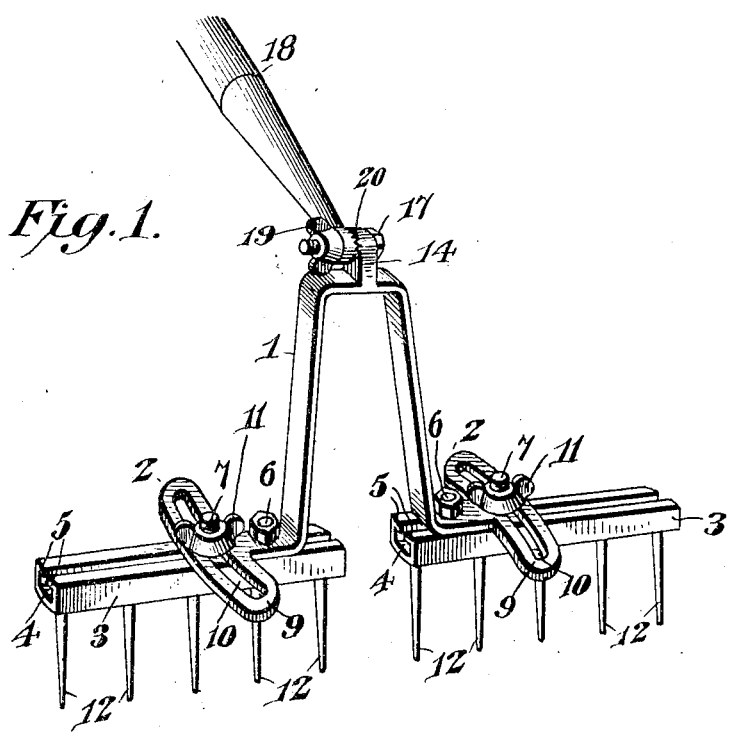
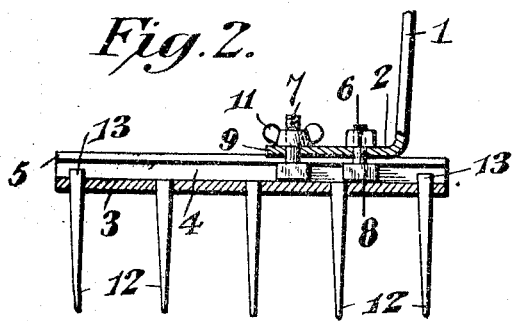
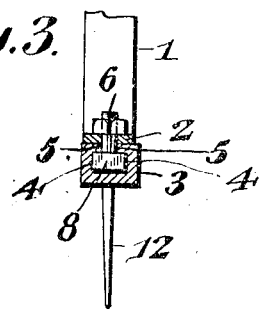
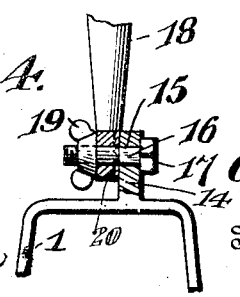
Gideon S. Adams, Inventor
Witnesses

UNITED STATES PATENT OFFICE.

GIDEON S. ADAMS, OF SEAVILLE, NEW JERSEY.

RAKE.

No. 885,309.

Specification of Letters Patent.

Patented April 21, 1908.

Application filed January 22, 1908. Serial No. 412,185.

*To all whom it may concern:*

Be it known that I, GIDEON S. ADAMS, a citizen of the United States, residing at Seaville, in the county of Cape May and State of New Jersey, have invented a new and useful Rake, of which the following is a specification.

The invention relates to improvements in rakes.

The object of the present invention is to improve the construction of rakes, and to provide a simple, inexpensive and efficient rake of great strength and durability, having adjustable rake heads adapted to be arranged in alinement contiguous to each other to form an ordinary straight rake, and capable of being spaced apart to straddle a row of plants, and also of being arranged at an angle to each other either when arranged together or spaced apart.

It is also the object of the invention to provide adjustable rake heads of this character capable of being overlapped to a greater or less extent to vary the size of the rake head and also to bring the teeth closer together.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a rake, constructed in accordance with this invention. Fig. 2 is a detail sectional view, taken longitudinally of one of the rake heads. Fig. 3 is a similar view taken transversely thereof. Fig. 4 is a detail sectional view, illustrating the construction for securing the handle socket to the arch.

Like numerals of reference designate corresponding parts in all the figures of the drawing.

1 designates a metallic arch adapted to straddle a row of plants, and provided at the lower ends of its sides with horizontally disposed laterally projecting arms 2 to which rake heads 3 are slidably and pivotally connected. Each rake head preferably consists of a metallic bar, provided with a longitudinal way consisting of a groove 4 having inwardly extending over-hanging top walls 5, formed by flanges projecting from the side walls of the grooves. The groove of each rake head is preferably rectangular in cross section, and it receives a pivot 6 and a set screw 7. The pivot, which is provided at its lower end with a squared head 8 to conform to the configuration of the groove or way of the rake head, pierces the arm 2 at a point intermediate of the ends thereof, and the said arm 2 is provided at its outer end with an enlargement or head 9, having an arcuate slot 10 through which the set screw 7 passes. The set screw is provided at its lower end with a squared head to conform to the configuration of the groove or way 4, and it is equipped at its upper end with a thumb nut 11 for engaging the head of the arm 2, whereby the rake head is securely clamped in its adjustment. By this construction, the rake heads are capable of a longitudinal sliding movement to adjust them toward and from each other, and they are also adapted to be swung horizontally to arrange them either in alinement or at an angle to each other.

The rake heads may be arranged in alinement and with their inner ends contiguous to each other to form an ordinary straight rake, and when adjusted in this manner to the limit of their inward movement, they are adapted to be arranged at an angle to each other in the form of an ordinary V harrow, the inner ends of the rake heads being round to facilitate such angular adjustment. The rake heads are also adapted to be arranged in spaced relation to straddle a row of plants, and they are adjustable inwardly and outwardly to suit the width of the rows. When spaced apart, they may be arranged at an angle to each other to work the soil either toward or from the plants and to cover small weeds.

The rake heads are equipped with teeth 12 and are provided with end stops 13 for preventing the heads of the pivot and the set screw from leaving the grooves or ways. These stops may be formed by projecting the end teeth through the bottoms of the grooves or ways, as shown in Fig. 2, or any other suitable means may be employed for this purpose.

The arch is equipped with a top lug 14, located at one side of the center and provided with a polygonal opening 15 for the reception of a squared portion 16 of a bolt 17, which pivots a handle 18 to the arch. The handle socket is provided at its pivot end with a circular opening to receive the bolt, which is equipped with a thumb nut 19 for clamping the socket in its adjustment. The lug is located at one side of the center of the arch in order to place the handle socket centrally of the same, and the squared portion of the bolt, which fits the polygonal opening of the lug, prevents the bolt from rotating when the thumb nut is turned.

The socket, which is adapted to receive an ordinary handle, may be arranged either in the same plane as the yoke to permit the device to be operated in the nature of a pitch fork or at any angle or inclination. Instead of operating the device by hand, suitable power may be employed. Also the engaging faces of the thumb nut and the lug 14 may be roughened or serrated, as shown at 20 to prevent the parts from slipping when adjusted.

Having thus fully described my invention, what I claim as new and desire to secure by Letters Patent, is:—

1. A rake comprising an arch provided at opposite sides with arms having slots, pivots mounted on the arms, a pair of rake heads provided with teeth and having longitudinal ways receiving the pivots of the arms, whereby the rake heads are slidably and pivotally connected with the arms, and fastening means operating in the slots of the arms and slidable in the ways of the rake heads for securing the same in their adjustment.

2. A rake comprising an arch having horizontal arms provided with heads having arcuate slots, pivots depending from the arms at points intermediate of the ends thereof and provided with heads, rake heads provided with teeth and having longitudinal ways receiving the heads of the pivots, and set screws mounted in the said arcuate slots and having heads slidable in the ways of the rake heads.

3. A rake comprising an arch provided at opposite sides with horizontal arms having slots, pivots depending from the arms and having lower heads, rake heads provided with teeth and having ways consisting of longitudinal grooves provided with over-hanging top walls or flanges, said ways receiving the heads of the pivots, set screws mounted in the slots of the arms and having pivots slidable in the said ways, and stops located at the ends of the ways for limiting the sliding movement of the rake heads.

In testimony that I claim the foregoing as my own, I have hereto affixed my signature in the presence of two witnesses.

GIDEON S. ADAMS.

Witnesses:
JOHN H. SIGGERS,
LEWIS EBERLY.